United States Patent
Goldfischer

[11] 3,819,920
[45] June 25, 1974

[54] DIGITAL FREQUENCY TRACKER

[75] Inventor: Lester I. Goldfischer, New Rochelle, N.Y.

[73] Assignee: The Singer Company, Little Falls, N.J.

[22] Filed: Jan. 29, 1973

[21] Appl. No.: 327,596

[52] U.S. Cl. ............. 235/152, 235/150.2, 235/156, 235/181, 324/78 D, 343/9
[51] Int. Cl. ...................... G06f 15/34, G01r 23/02
[58] Field of Search ................. 235/152, 181, 150.2; 324/77, 78 D, 79 D; 343/8, 9, 112 S; 73/178

[56] References Cited
UNITED STATES PATENTS

| | | | |
|---|---|---|---|
| 3,267,474 | 8/1966 | Greenlee et al. | 324/78 D |
| 3,403,338 | 9/1968 | Martin | 324/79 D |
| 3,663,885 | 5/1972 | Stewart | 324/78 D |
| 3,713,151 | 1/1973 | Kofsky | 343/8 |
| 3,721,977 | 3/1973 | Darboven | 343/8 |
| 3,733,549 | 5/1973 | Harzer | 324/79 D |

*Primary Examiner*—Felix D. Gruber
*Attorney, Agent, or Firm*—T. W. Kennedy

[57] ABSTRACT

A digital frequency tracker for a Doppler navigation system in which the input is sampled, autocorrelation function values computed therefrom, and the values used in a Fourier series computation to obtain powers bracketing a center frequency. From these computations tracking and acquisition is provided by shifting the center frequency as a function of the computation until equal power occurs on both sides of the center frequency. Also shown are means to compute altitude by sampling at the FM modulation rate.

9 Claims, 14 Drawing Figures

FIG. 6
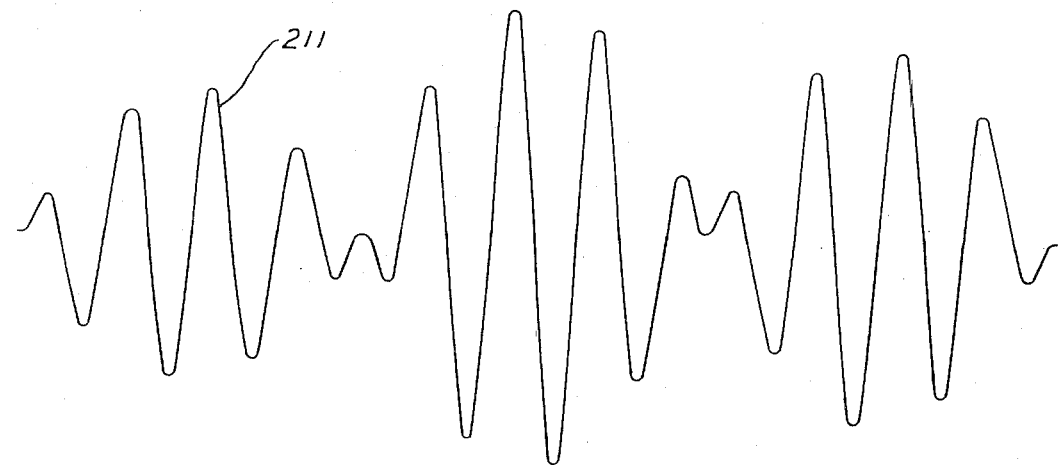
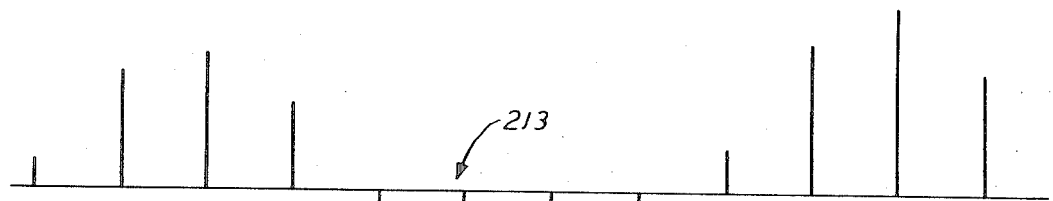
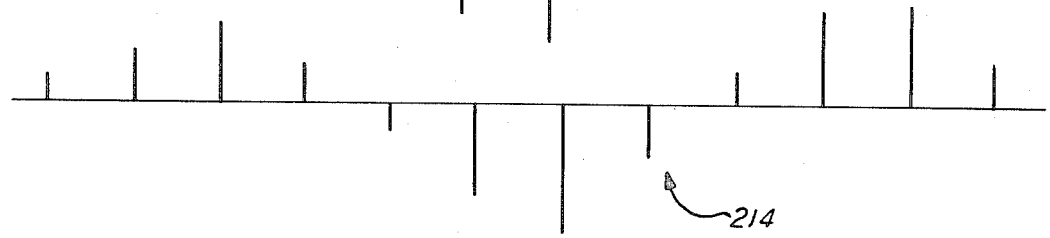
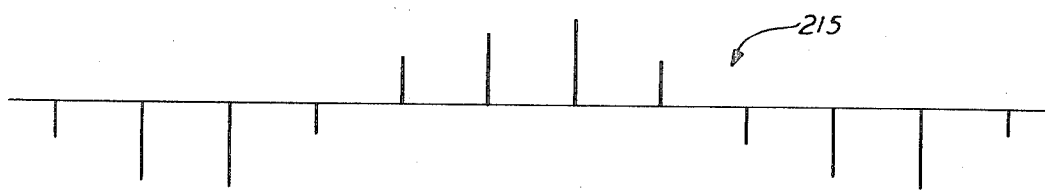

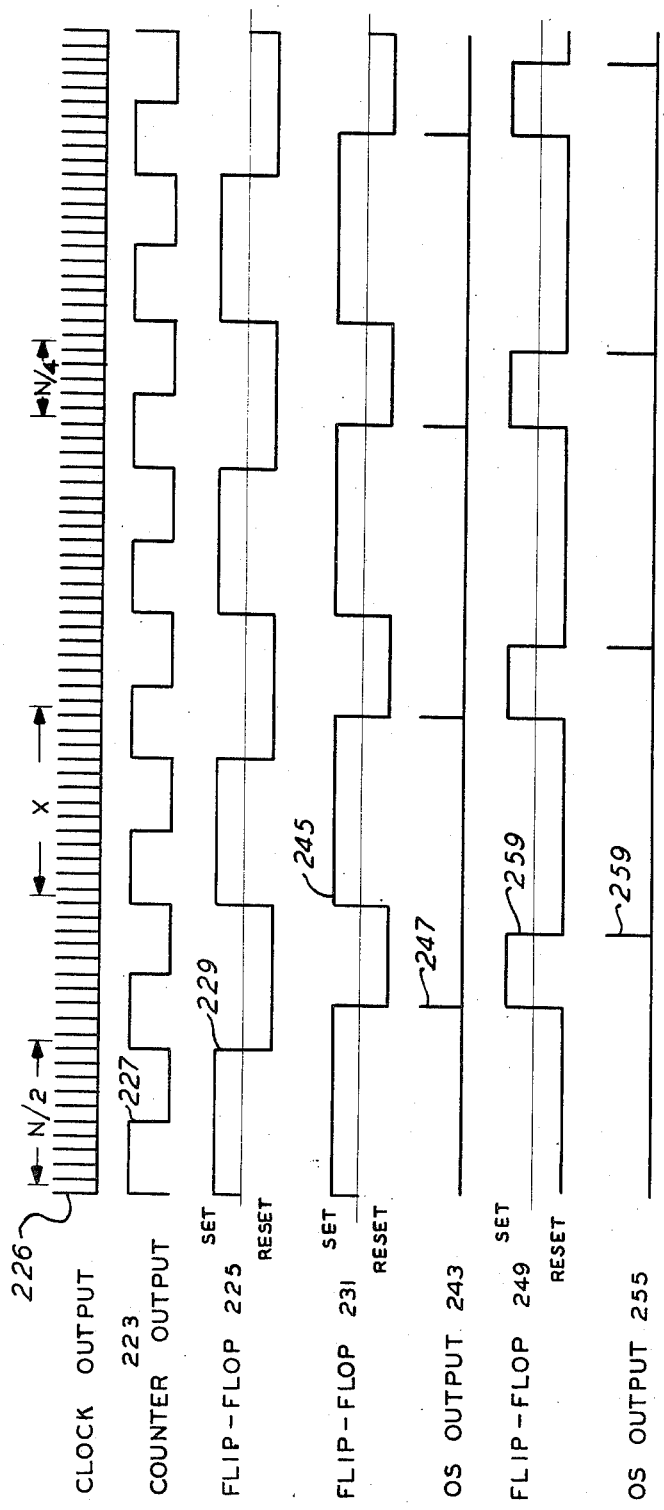

AUTO CORRELATION FUNCTIONS

INTEGRATED POWER DENSITY
R = N/S = 0.5

DIGITAL FREQUENCY TRACKER

BACKGROUND OF THE INVENTION

This invention relates to doppler navigation systems in general and more particularly to a digital frequency tracker useful in such systems.

In a doppler navigation system one or more beams of microwave energy are radiated toward the ground and the received radiation is then processed to obtain velocity information. Because of the doppler effect a frequency shift occurs which is proportional to the velocity of transmitting device with respect to the ground. The received signal is processed in a receiver front end and through IF stages which provide an output to a frequency tracker. The purpose of the frequency tracker is to determine the center frequency of the received signal and thereby determine the frequency shift which is proportional to velocity. At the input to the frequency tracker the signal will comprise a doppler return signal superimposed on broad band noise. The signal as viewed in the frequency domain will be essentially gaussian shaped with a peak power density at the center frequency of the signal and a bandwidth which is a percentage of the center frequency. The frequency tracker must determine what this center frequency is. In the past this has been done through the use of analog circuitry which has been quite complex and expensive and is also bulky. In general terms, the frequency tracker of the prior art has determined the power at two frequencies bracketing the center frequency and from these found an average. The frequencies at which the power is measured are shifted up and down until the power measured at each is the same, at which point they will bracket the center frequency.

These analog systems have worked well and have been most practical in prior art systems. However, many of the aircraft in which doppler navigation systems are now used have an onboard general purpose digital computer which makes digital processing of the signal more attractive and more economical. Even if the aircraft does not have an onboard computer, the availability of integrated circuits makes it possible to construct a very small special purpose digital computer to provide the required signal processing. Thus, a digital frequency tracker which can provide the required accuracy would provide a very attractive addition to the doppler navigation system.

SUMMARY OF THE INVENTION

The present invention makes use of known characteristics of signals to provide a simple digital frequency tracker. The input signal is clipped and the clipped signal sampled at a relatively high rate to provide input data to be used in calculating a number of points on the signal autocorrelation function. These autocorrelation function values provide the coefficients for a Fourier series which is representative of the power spectral density of the signal. By providing different frequencies as inputs to the Fourier series, two frequencies which have equal power and, thus, bracket the center frequency may be found and therefrom the center frequency may be determined. Since the frequency tracker must not only track but must initially acquire the signal, means are provided for signal acquisition including means to sweep across the frequencies at which the signal is expected. The acquisition means also provide a constant check to make sure the signal is not lost. In one embodiment of the invention, with very little modification, the altitude of the aircraft may also be computed by sampling at the FM frequency which modulates the transmitted signal and providing variable phase shift between the transmitted signal and the sampling signal to obtain two sets of samples whose signal-to-noise ratios are equal in magnitude. The phase between the transmitted frequency modulation and and the sampling signal at which equal signal-to-noise ratios occur will then be proportional to the altitude of the aircraft. The required computations may be performed by an onboard computer or may be done in special purpose computing hardware. A simplified implementation of the latter is disclosed below.

BRIEF DESCRIPTION OF THE DRAWINGS

FIG. 6 is a waveform diagram helpful in understanding the altitude computing portion of the present invention.

FIG. 7A is a waveform diagram showing various waveforms associated with FIG. 7.

DETAILED DESCRIPTION OF THE PREFERRED EMBODIMENT

Figure 1:
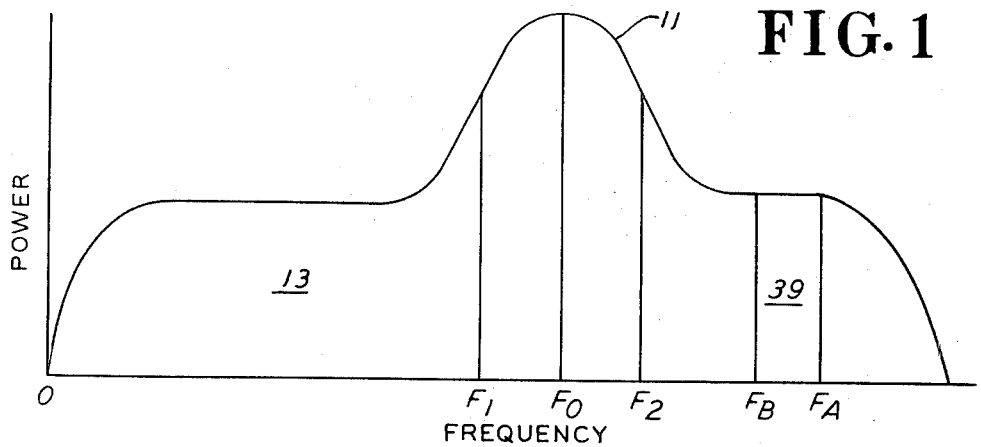
FIG. 1 is a plot of power vs. frequency illustrating the Doppler signal.

The nature of the frequency spectrum of the input signal is shown on FIG. 1. A DOPPLER SIGNAL 11, which is essentially Gaussian shaped, is superimposed upon wideband noise 13. The peak of the doppler signal will be at a frequency $F_0$ which is the doppler frequency and from which may be found the velocity of the aircraft. In essence, the frequency tracker of the present invention performs the same function as those of the prior art frequency trackers in that a frequency $F_1$ and a frequency $F_2$ are found at which the power is equal. Because of the shape of the curve these two frequencies will then bracket $F_0$ and by averaging them $F_0$ may be found. The digital frequency tracker to be described below makes use of a Fourier series representation of the waveforms. The Fourier series will provide an indication of the power at any given frequency. Thus, by sequentially placing different values of $F_1$ and $F_2$ into the series and continuing this process until equality results, the frequency $F_0$ may be found. The coefficients of the Fourier series are found through the use of autocorrelation functions developed from the input signal. The appendix outlines the mathematical devlopment of this approach. The series representing the power at a frequency F is as follows:

$$A_0 + A_1 \cos 2\pi F T + \cos 4\pi F T + \text{------}$$

or $$A_0 + \sum_{K=1}^{\infty} A_K \cos 2\pi KFT$$

where $$A_K = \sin\left[\frac{\pi}{2N} \sum_{n=1}^{N} S(n)S(n+k)\right]$$

is the autocorrelation function and where N equals the number of samples used, $S(n)$ equals $\pm 1$ depending on whether the nth sample is positive or negative and $S(n+k)$ is $\pm 1$ depending on whether the $n+k$ sample is positive or negative. T is the sampling period or one over the sampling frequency, which should be at least twice the highest frequency component in the signal being sampled.

As described in the appendix, a number of samples such as N equal to 150 would be used and somewhere in the order of 15 to 25 points on the autocorrelation function might be calculated. For purposes of simplification in the following description we will assume a total of only eight samples and four points on the autocorrelation function. Implementation with larger numbers would follow the same basic scheme with hardware components being increased accordinly.

Figure 2:
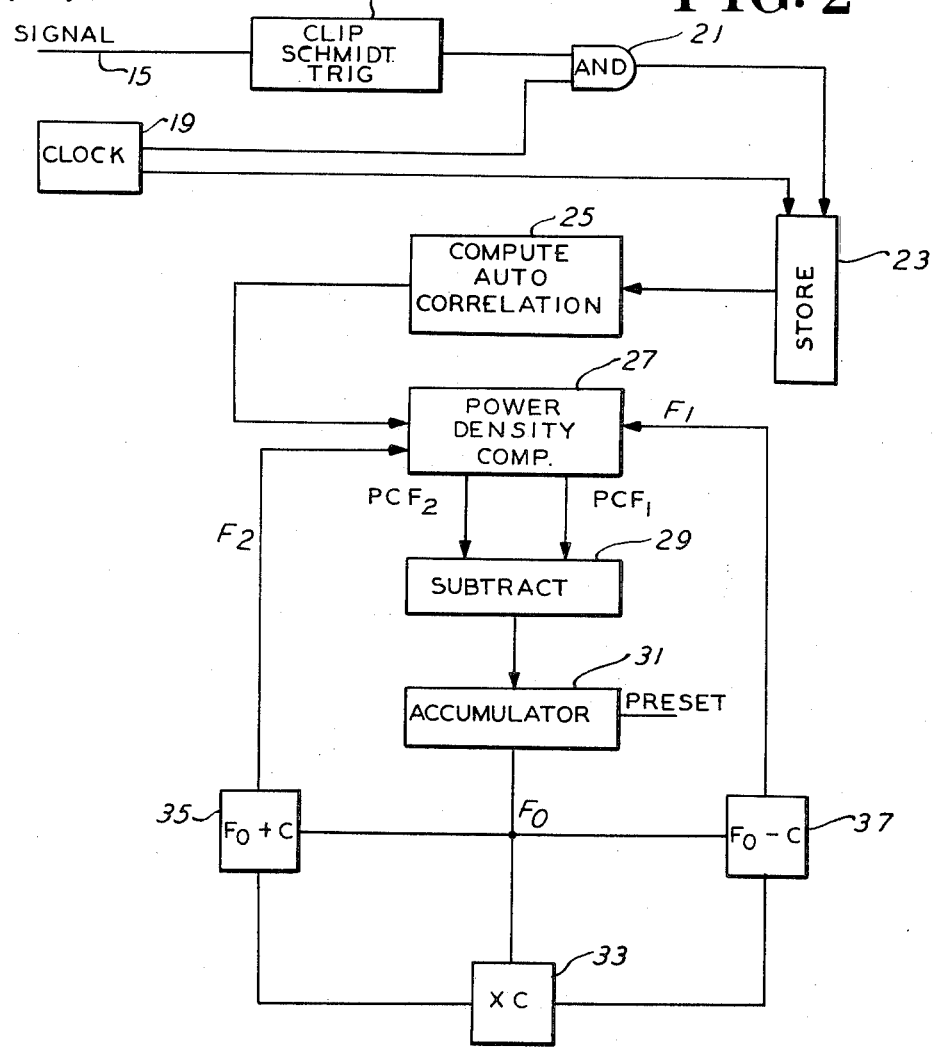
FIG. 2 is a basic block diagram of the tracker of the present invention.

FIG. 2 shows an overall block diagram of the system. The incoming signal on line 15 is hard clipped by a clipper such as a Schmidt trigger 17. The clipped signal is then sampled by ANDing the output of clipper 17 with narrow sampling pulses from a clock 19 in AND gate 21. If a pulse is present at the output of clipper 17 coincident with the clock pulse, a high output of AND gate 21 will result. If no pulse is present from clipper 17, a zero output from AND gate 21 will result. These outputs are then shifted into a storage shift register 23. The required numbers of samples are made and the autocorrelation function values then computed by block 25. After computation of these functions the output of block 25 is used to provide the coefficients to compute the Fourier series in block 27 which has as its other inputs the frequencies $F_1$ and $F_2$. The hardware in block 27 will first compute the power at $F_1$ and then compute the power at $F_2$. These two powers will then be subtracted in a block 29 and the result accumulated in block 31 and used to provide an output representative of $F_0$. The $F_0$ output is multiplied by a constant $C$, which is equal to or less than one, in block 33. The reason for this is that the bandwidth of the signal 11 on FIG. 1 will normally be a fraction of the center frequency. Thus, for best results, $F_1$ and $F_2$ should respectively be at predetermined percentages below and above the frequency $F_0$. The output of block 33 is provided to a block 35 where it is added to $F_0$ to obtain $F_2$ and to a block 37 where it is subtracted from $F_0$ to provide $F_1$. The outputs of these blocks are then provided back to the power density computation in block 27 to be used on the next iteration of the computation.

The error out of block 29 will cause $F_0$ to shift up and down until the power at $F_1$ and $F_2$ are equal. Thus, after a number of iterations, the frequency $F_0$ will accurately represent the center frequency of the doppler signal.

Before the signal may be tracked as described above, the signal must first be acquired. An examination of FIG. 1 will show that, if the power within a band, for example, band 39, can be measured at various frequencies, an indication will be provided of whether the band is in the frequency range of the doppler signal or just in noise. As shown by band 39, the power would have a lower level than if the band were centered at $F_0$. Thus, by sweeping a band such as this across the frequency spectrum and measuring its output, the signal-to-noise ($S/N$) ratio can be found. This concolusion follows from the fact that, as a result of the clipping operation, the area under the total curve in FIG. 1 is constant. Depending on the width of band 39, when it encompasses the signal there is a fixed relationship between $S/N$ ratio and the power (or area under the curve) within the band. By comparing the power within the band with a predetermined value set for minimum useable $S/N$, it is immediately evident whether signal or noise is contained therein and, in the former case, whether $S/N$ ratio is adequate for frequency tracking. During the acquisition stage a preset input may be provided to accumulator 31 and block 27 used to calculate the power in a band such as band 39 shown on FIG. 1. The output of subtractor 29 will cause the frequency $F_0$ to increase or decrease until a point is reached where the power exceeds the predetermined value at which point the system can go into the tracking mode. This will be explained in more detail in connection with the figures below. The system makes use of the fact that the power in a band such as 39 may be found by integrating from zero to a frequency of $F_A$ and also integrating from zero to a frequency of $F_B$ and subtracting these two results to find the power under that portion of the curve. When the equation above for the Fourier series is integrated, each of the terms of the equation will be integrated resulting in a typical term such as $An/2\pi nt \sin 2\pi F N T$. Thus, the same basic system, by computing the sines rather than the cosines and dividing by the additional term in the coefficient, can compute the power density within the band 39.

In the figures which follow the computational circuits used are shown in simplified form and only the basic timing signals are described. It is well within the ability of those skilled in the art to select from the various available micro-circuit components the necessary multipliers, accumulators, counters, etc., and to provide the other necessary inputs thereto in accordance with the manufacturer's specifications. Additionally, in many cases a block will output a digital word of a plurality of bits which will be gated to another block. In such cases, only one gate is shown. It will be recognized that in practice a gate must be provided for each bit.

Figure 3:
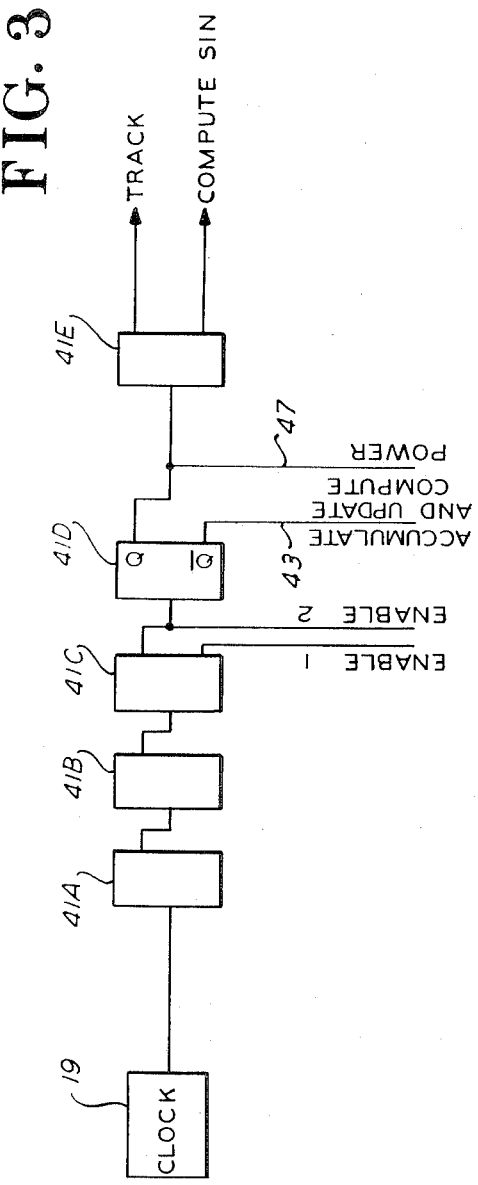
FIG. 3 is a block diagram of the basic timing circuits of FIG. 2.

FIG. 3 illustrates the basic timing for the system. As indicated above, the illustrated circuits assume only eight samples and four autocorrelation function values. This will require a total of 12 clock pulses to accumulate the required data. An additional four clock pulses are required to perform shifting. Thus, 16 clock pulse periods are set aside for the accumulation of data. This is accomplished by dividing the clock pulses through four flip-flops 41A through 41D. The Q output of 41D is provided on line 43 as an accumulate and update enable. This is shown by waveform 45 on FIG. 3A. The Q output of flip-flop 41D is provided on line 47 as an enable for the computing of the power and is shown by waveform 49. A fourth flip-flop 41E performs a further division by 2 to divide the time into a signal-to-noise ratio computation period as shown by waveform 51 and a tracking period as shown by waveform 53. The signal to noise computation is used during acquisition and for checking for a loss of signal as will be described below.

Figure 4:
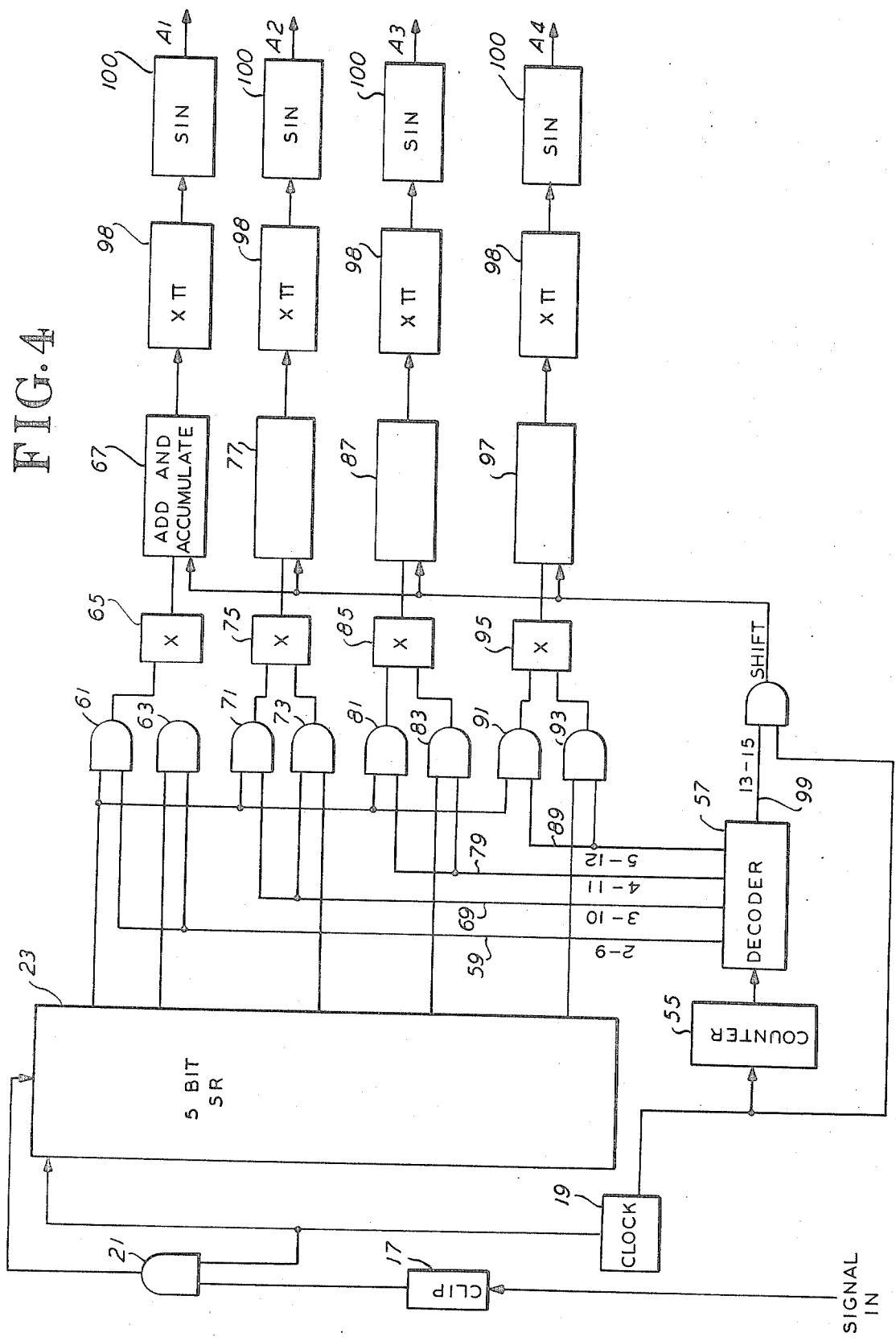
FIG. 4 is a block-logic diagram showing the autocorrelation function computations of FIG. 2.

FIG. 4 illustrates the portion of the system in which the coefficients are computed as autocorrelation functions. Gate 21 of FIG. 4 is shown as having an enabling input labeled accumulate from the accumulate output line 43 of FIG. 3. Thus, during the accumulate period this gate will be enabled and pulses will be gated into and shifted through shift register 23. The embodiment shown here is a serial type implementation where computations are done in a serial fashion and only five bits need be used at any one time. The computation could equally well be done by storing 12 bits and then computing the autocorrelation values. The autocorrelation function values are essentially found by assembling a string of data, then shifting that data a number of bits equal to K in the equation given above and then multiplying the bits in the two strings. For these multiplications, a one in shift register 23 is treated as 1 but a zero is treated as $-1$. For K equal to one the first and second bits of the data and second and third and so on must be multiplied. For K equal to two the first and third, the second and fourth bits must be multiplied and so on.

In the serial manner in which this is accomplished in the embodiment in FIG. 4, the clock 19 is provided as an input to a counter 55 which has its output connected to a decoder 57. Counter 55 will be a modulo 16 counter, i.e., it will count to 16 and repeat. Decoder 57 will comprise a plurality of decoding gates arranged in a manner well known in the digital computing art to provide five outputs. One output will be present when the count is two through nine. The next when the count is three through 10. The next when the count is four through 11. The next when the count is five through 12. A final output is provided when the count is 13 to 15. After the second bit is shifted into shift register 23 the first and second bits respectively will be in the first two places in the shift register. At this point an output on line 59 from decoder 57 will enable gates 61 and 63 which have as their respective inputs the first two bit positions of the shift register and provide the outputs to a multiplier 65 in which the two bits will be multiplied and then provided to an adder and accumulator 67. After the next bit is shifted into shift register 23 the first two positions will now contain bits 2 and 3. These will similarly be multiplied in block 65 and added to the result of the first multiplication and accumulated in block 67. At this point line 69 from decoder 57 will also have an output enabling gates 71 and 73 which have as their respective inputs the bit from bit position 1 and the bit from bit position 3. In bit position 1 is the third bit and in bit position 3 is the first bit. These two bits will be gated to multiplier 75 from which they will be provided to an adder and accumulator 77 in a manner similar to that described above. Similarly, the first and fourth bits will be provided by AND gates 81 and 83, in response to an enabling input on line 79, to multiplier 85 and accumulator 87. After the fifth bit is input, an enabling input on line 89 will enable gates 91 and 93 to provide the first and fifth bits to multiplier 95 having its output connected to adder and accumulator 97. After the first through eighth bits have been multiplied by the second through ninth bits the output on line 57 will no longer be present and gates 61 and 63 will be disabled. At this point accumulator 67 will have contained therein the sum of the eight multiplications. Similarly, after the tenth bit gates 71 and 73 will be disabled, after the eleventh, gates 81 and 83 and after the twelfth, gates 91 and 93. The accumulators 67, 77, 87, and 97 will each have the sum of eight multiplications stored therein. From the equation given above for computing the autocorrelation function it can be seen that a division by 2N is required. In this case, N is equal to eight. Since all the numbers are in binary form, a division by 2N or 16 may be accomplished by four shifts. To do this, the decoder output on line 99 enables gate 101 to allow four clock pulses to be provided to each of the accumulators 67, 77, 87, and 97 to shift the numbers stored therein four places effecting a division by 16. The output of each of the respective blocks will then be provided to a multiplier 98 to be multiplied by $\pi$ and the output of multiplier 98 provided to a sine generator where the sine of the input will be found and provide the final outputs $A_1 - A_4$. Sine generators 100 may be of the type described below in connection with FIG. 5. Also, although separate multipliers 98 and sine generators 100 are shown, it will be recognized that a single one of each may be used and the signals multiplexed in well known fashion.

Figure 5:
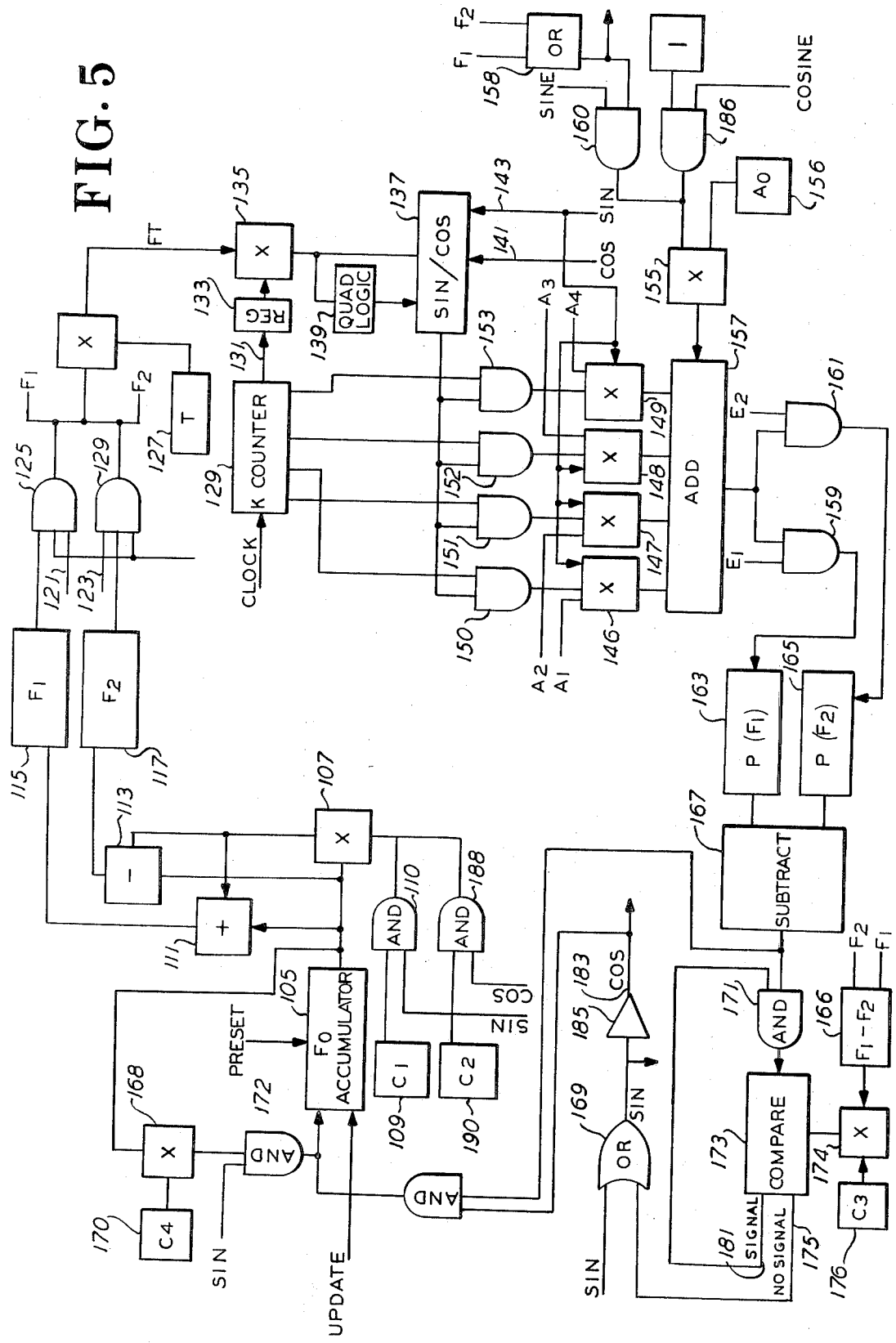
FIG. 5 is a block-logic diagram illustrating in more detail the remainder of the circuits of FIG. 2.

A block diagram of the remaining computations is shown on FIG. 5. Assume that the system has just started in operation. A number representing $F_0$, a frequency which will be above that of the expected doppler system will be preset into $F_0$ accumulator 105. The output of accumulator 105 is provided to a multiplier 107 where it is multiplied by the value of $C_1$ stored in the block 109, via AND gate 110 enabled by the line labeled "sin," the source of which will be described below. The output of block 107, which will be a percentage of the frequency $F_0$ in the accumulator 105, is added to $F_0$ in block 111 and subtracted from $F_1$ in block 113. These outputs respectively are stored as the $F_1$ and $F_2$ values in storage registers 115 and 117 respectively. These correspond to the $F_a$ and $F_b$ values of FIG. 1. The respective outputs of blocks 115 and 117 are sequentially gated to a multiplier 119 in response to a compute signal on line 47 and Enable 1 (E1) and Enable 2 (E2) signals on lines 121 and 123 respectively. The E1 and E2 signals are provided by flip flop 41C of FIG. 3. Each of these periods will be half of the compute period of waveform 49 of FIG. 3A. Thus, during the first half of the compute period the value stored in register 115 will be provided through gate 125 to multiplier 119 where it will be multiplied by the stored value of T, the sampling period, stored in a register 127. During the second half of the compute cycle the value of $F_2$ stored in register 117 will similarly be provided by gate 129 to the multiplier 119. The output of multiplier 119 will provide the FT required ithe above equation. Before finding the sine or cosine this result must also be multiplied by $2\pi K$. A clock input is provided to a K counter 129 which will divide each of the E1 and E2 periods into four segments providing an output on line 131 which will cause the constants $2\pi$, $4\pi$, $6\pi$, and $8\pi$ stored in a storage register 133 to be sequentially provided to multiplier 135. Thus, in sequence, the multiplier will provide as an output the values of $2\pi\ FT$, $4\pi\ FT$, $6\pi\ FT$ $8\pi\ FT$. These are provided to a sine-cosine function generator 137. Quadrant logic in block 139 will decode the two most significant bits of the angle to be processed to determine in which quadrant it resides and provides a further input to the function generator 137. Also provided into generator 137 is a cosine enable on line 141 or a sine enable on line 143. Since we are now in the acquisition stage the sine will be computed and that input will be present. The manner of generating these inputs will be described below. The sine-cosine function generator may be of the type described in U.S. application Ser. No. 258,953, entitled "High-Speed Function Generator" filed by Curtis J. Blanding on June 2, 1972, and assigned to the same assignee as the present invention. Outputs from the $K$ counter 129 cause the four sequential outputs of the function generator 137 to be provided respectively to multipliers 146 through 149 by sequentially enabling AND gates 150 through 153. In multipliers 146 through 149 the respective sines are multiplied by the coefficients A1 through A4. A sine input which is provided from line 143 to each of the multipliers will cause a further multiplication by the coefficient $1/(2\pi\ NT)$ resulting from the integration described above when the sine series is being used. The computed terms are then added together along with the $A_0$ times $F_2$ or $F_1$ from multiplier 155. $A_0$ is provided by storage register 156 and $F_2$ or $F_1$ from ORgate 158 through an AND gate 160 enabled by the S/N output of FIG. 3. The output of adder 157 is provided to AND gates 159 and 161 which are enabled respectively by the $E_1$ and $E_2$ signals described above. Thus, when $F_1$ is being provided into multiplier 119 gate 159 will be enabled and the computed power from adder 157 will be gated by gate 159 to a register 163. Similarly, during the $F_2$ computations the output of adder 157 will be gated to register 165. The outputs of registers 163 and 165 are provided to a subtractor 167 where they are subtracted. Since the system is in the signal-to-noise computation stage, the $S/N$ input to an ORgate 169 will cause that gate to have an output which will be provided as an enabling input to AND gate 171 having as a second input the output of the subtractor 167. AND gate 171 will gate this output to a comparator 173 where the value, which will be the power density in the band 39 described in connection with FIG. 1, will be compared with a value which, when exceeded, is indicative of the band being in the signal area. The value used for comparison will be obtained from multiplier 174 which will multiply $F_2 - F_1$ from subtractor block 168, which obtains inputs from the inputs to gate 158, by a predetermined constant $C_3$ stored in block 176. Assume that the output of subtractor 167 does not exceed this value. In that case, an output on line 175 of the comparator indicating "no signal" will result and be provided as an input to gate 169. The output of gate 169 is the sine input to the function generator 137 (and to gate 110). This output is inverted in inverter 185 to obtain the cosine output. Thus, as long as the system is in the signal to-noise computation period or as long as no signal is indicated by comparator 173, the system will continue to compute the sine series and continue to keep gate 171 enabled.

After each computation the previous value of $F_0$ will be provided to multiplier 168 where it will be multiplied by a constant $C_4$ from block 170 and be provided as a new input through gate 172.

Figure 3A:
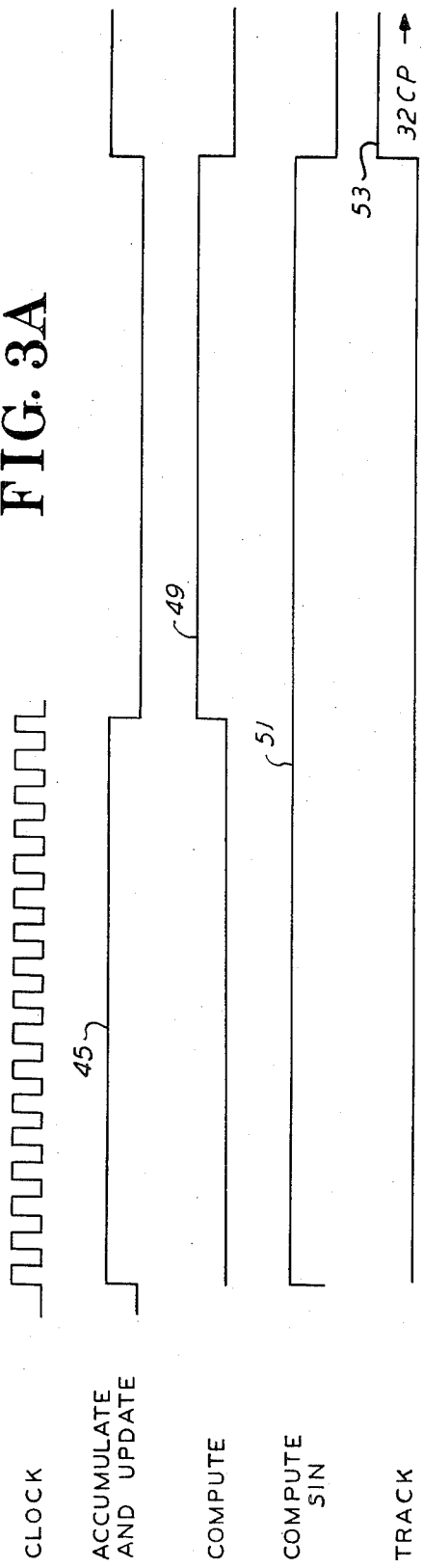
FIG. 3A is a waveform diagram illustrating the various outputs of FIG. 3.

The new valve in the $F_0$ accumulator 105 will again be processed in the same manner as indicated above when the next compute cycle 49 as shown on FIG. 3A occurs. This process will continue until an output occurs on line 81 indicating that $F_0$ is in a signal area. Once this happens, on the next track cycle of waveform 53 of FIG. 3A, the gate 169 will not have a "no signal" input and will not have the S/N input and thus its output will be zero. When inverted this will cause a high output on the cosine line 183 from inverter 185. This will disable gate 171 and will cause function generator 137 to compute the cosine terms. It will also enable gate 186 to cause $A_0$ to be multiplied by one in multiplier 155 to provide the $A_0$ term for the cosine series to adder 157. In addition, gate 188 will have been enabled to allow a stored constant $C_2$ in block 190 to be used in multiplier 107. Two constants $C_1$ and $C_2$ are required since the bandwidth of $F_1 - F_2$ and $F_a - F_b$ of FIG. 1 are normally different. The values stored in registers 163 and 165 will now represent the power at the frequencies $F_1$ and $F_2$ rather than the power density under the curve. If they are equal, the frequency in frequency counter 105 is the correct center frequency. However, if they are unequal an error exists and $F_0$ must be shifted up or down depending on the direction of the error. When the update period as shown by waveform 45 of FIG. 3A occurs, accumulator 105 is enabled to allow the output of subtractor 167 to be provided to accumulator 105. The difference or a function thereof will be added or subtracted to the valve in accumulator 105, depending on the sign of the output of subtractor 167.

Now that the tracker is locked on to the signal it will alternately go through the $S/N$ calculation stage and track stage. This insures a constant check to make sure that the signal is always present and has not been lost. If at any time the signal is lost, the "no signal" output of comparator 173 on line 175 will cause gate 169 to continue to have an output to put the tracker in the search mode until the signal is found.

With a few additions, the system described above can also provide information as to aircraft altitude the Doppler transmitter receiver with which the system is used when determining altitude must be of a type of construction or so modified to provide the proper type of signal outputs. The transmitter must be capable of accepting an external F.M. reference. In addition the receiver output which is the signal input to the system where altitude is to be determined must be the output of a homodyne detector which has been passed through a symmetrical band pass filter centered around the fundamental FM frequency. The filter will also contain a notch at the FM frequency so that no leakage will be passed through outputs such as these are well known to those skilled in the art. Under these conditions, the signal will consist of two coherent doppler sidebands; in fact, the signal can be described as being two AM sidebands with the carrier suppressed. In the absence of noise, such a signal has the appearance of a sinusoid at the frequency and phase of the carrier whose amplitude varies directly as the magnitude of the modulation, with the phase jumping 180° whenever the polarity of the modulation reverses. The phase of the suppressed carrier carries the altitude information while the modulating waveform carries the doppler information. The type of signal described above is shown by waveform 211 of FIG. 6. If this signal were sampled at the FM rate, the resultant sequence would be proportional to the sequence derived by sampling the modulation alone. The constant of proportionality depends on the phase relationship between the samples and the suppressed carrier. Taking the zero phase reference to coincide with the positive peaks of the suppressed carrier, the constant of proportionality varies as the cosine of the relative phase between samples and carrier. This is illustrated by waveforms 213, 214, and 215.

In the absence of noise, which is the case illustrated in FIG. 6, a little thought will show that if the signal were first clipped and then sampled at the FM rate, the resultant sequence would be identical with the sequence derived by clipping the modulation alone and sampling this at the FM rate. Thus, the resultant one bit digital samples could be processed by the digital frequency tracker as if they were derived from a doppler signal whose spectrum was referenced to zero frequency. In fact, for this case (i.e., no noise) the phase of the samples relative to the carrier is very nearly irrelevant.

However, when the double sideband suppressed carrier signal is superimposed on the breadband noise, the phase of the samples relative to the carrier becomes an important parameter. First consider the case where the combination of signal and noise are uncorrelated so that the power spectral density versus frequency associated with the sequence of samples may be thought of as the sum of a component due to the noise alone and a component due to the signal alone. Furthermore, the noise being random with respect to the FM frequency, the noise power spectral density versus frequency is independent of the relative phase of the sample windows. On the other hand, as discussed above and illustrated in FIG. 6, the power spectral density versus frequency of the signal varies as the square of the cosine of the phase angle of the sample windows relative to the carrier. Thus, the signal-to-noise ratio associated with a specific set of signal plus noise samples in the absence of clipping is directly proportional to the square of the cosine of the relative phase of the sample windows.

Now consider the case where the combination of signal and noise is first clipped before sampling. The resultant sequence of samples is identical to the sequence derived by clipping the sum of the noise and the product of the modulation (i.e., the doppler waveform) and the cosine of the relative sample phase and then sampling. The manner in which the clipped samples may be used to reconstruct a normalized version of the power spectral density versus frequency of the combination of signal plus noise before clipping is described above. Therefore, it may be concluded that the variation of signal-to noise ratio with relative phase is not disturbed by the clipping process.

The behavior just described forms the basis for determining the phase of the suppressed carrier. First the double side band signal plus noise is clipped and then sampled in such a way as to produce two sets of samples, each synchronous withthe FM reference but displaced from each other by 90° in phase (i.e., one quarter of an FM cycle). Each set is then processed by the digital frequency tracker where, as part of the acquisition procedure described above the signal-to-noise ratio is calculated. The difference in the indicated signal-to-noise ratios is used to shift the mean phase of the two sample sets relative to the FM reference until the difference goes to zero. When this takes place, the sample sets straddle either the peaks or the zeros of the suppressed FM carrier, the choice being determined by the polarity of the feedback arrangement. Inasmuch as there are two zeros and two peaks per carrier cycle, this scheme has an inherent ambiguity of 180° which must be resolved if a range greater than 180° is desired. For frequency tracking purposes, the autocorrelation functions calculated from the two sample sets could first be averaged before being subjected to further processing.

Figure 7:
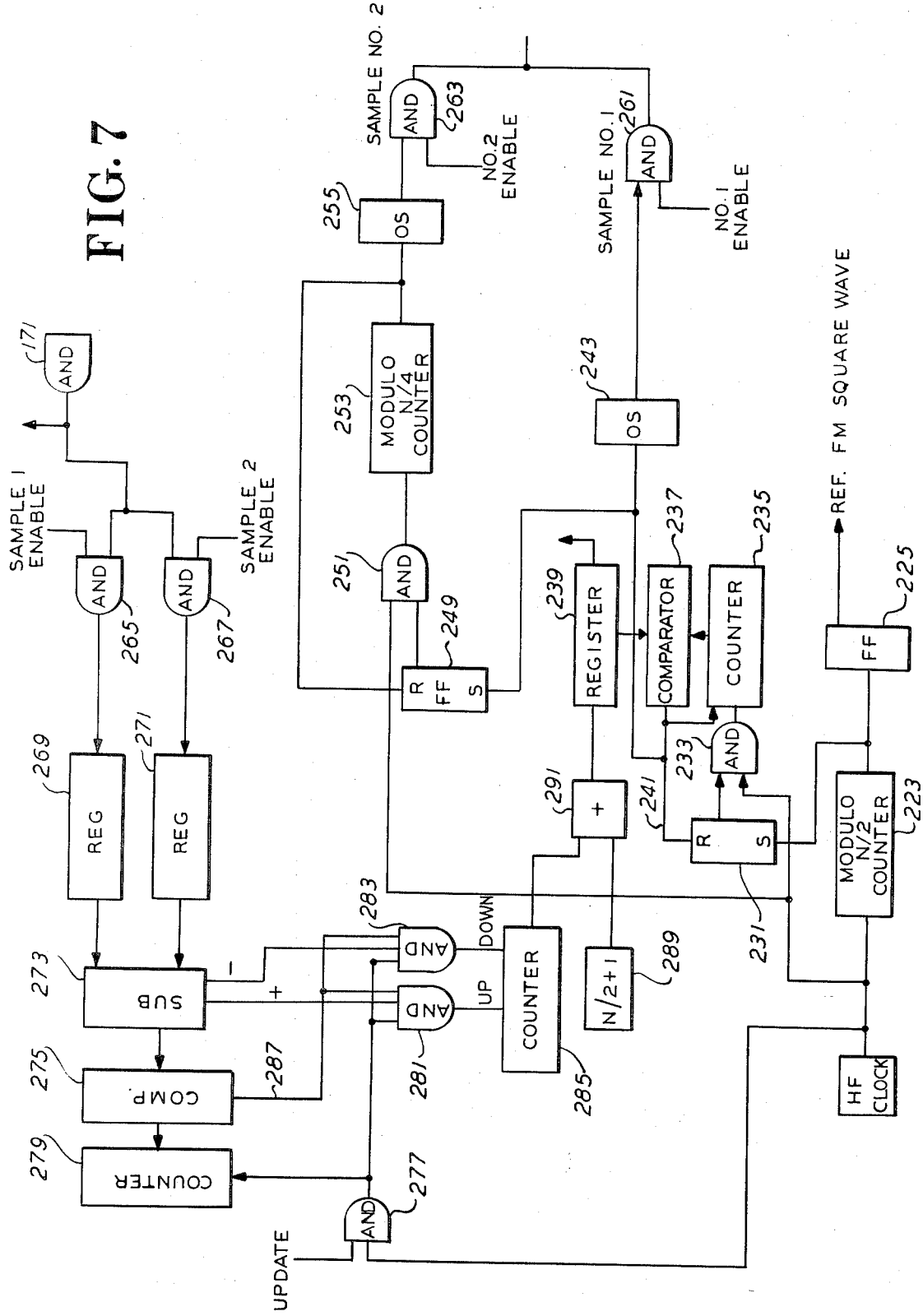
FIG. 7 is a block-logic diagram of the altitude computation circuits.

The additional hardware required to compute altitude is shown on FIG. 7. A high frequency clock 221 provides an input to a modulo $N/2$ counter 223 which divides down the frequency of clock 221. The output of the counter 223 is then further divided by two in flip-flop 225 to provide the reference FM squarewave. These waveforms are shown on FIG. 7A. A clock output is shown as waveform 226, counter 223 output as waveform 227, and the output of flip-flop 225 as waveform 229. The output of counter 223 also sets a flip-flop 231 which provides an enabling input to an AND gate 233 permitting pulses from clock 221 to enter counter 235. Counter 235 is the first input of a register 239 in which will be stored a number relating to the required offset as will be described below. When the count in counter 235 reaches the number in register 239 an output from comparator 237 will be provided on line 241 to reset flip-flop 231 and reset counter 235. This output is also provided to a one shot multivibrator 243 which provides the first train of sampling pulses designated as sample No. 1. The output of flip-flop 231 is shown as waveform 245 on FIG. 3 and the output of one shot 243 as waveform 247.

The output of comparator 237 also provides a set input to a flip-flop 249 which enables an AND gate 251 to permit clock pulses to enter counter 253. Counter 253 is a modulo $N/4$ counter and will count to that number and then provide an output which will reset flip-flop 249. This output is also provided to a one shot 255, the outputs of which are the second set of sampling pulses designated sample No. 2. The respective outputs of flip-flops 249 and one shot 255 are shown as waveforms 257 and 259 of FIG. 7A. In connection with FIG. 3 above, the timing of the system was discussed. As described therein and in connection with the other figures, the total operation was divided up into an acquisition phase as indicated in waveform 51 and a tracking phase as indicated by waveform 53. During the acquisition stage the power density under the curve which relates directly to signal to noise ratio was computed. With the altitude computation included in the system, two acquisition phases must be gone through in order to compute the two signal to noise ratios to be used for comparison. Thus, the system of FIG. 3 would have to be modified accordingly in a manner well known in the art. During the first acquisition phase an output indicated as sample No. 1 enable will be provided and during the second phase an output labeled as sample No. 2 enable will be provided. These will respectively enable AND gates 261 and 263 which have their outputs tied together and will replace the clock input of clock 19 of FIG. 5. Thus, during the first acquisition phase the sample No. 1 pulses will be provided as sampling pulses and during the second acquisition phase the sample No. 2 pulses will be provided for sampling. Operation will be as described above up to AND gate 171 of FIG. 5. At the output of gate 171 an additional line is provided as shown on FIG. 7 to a pair of AND gates 265 and 267. These gates are respectively enabled by the sample No. 1 enable and the sample No. 2 enable. Thus, in addition to being provided to the comparator 173 of FIG. 5, the outputs of subtractor 167 will be loaded into registers 269 and 271. Register 269 having its input from AND gate 265 will contain the output obtained when using the sample No. 1 pulse train and register 271 will have the output obtained using the sample No. 2 pulsetrain.

These two stored values will then be subtracted in a subtractor 273, the output of which will be provided as one input to a comparator 275. During an update phase of operation a gate 277 will be enabled to permit pulses from clock 221 to enter a counter 279 to provide a second input to comparator 275. Gate 277 also provides the clock pulses to an AND gate 281 and an AND gate 283. These gates respectively have their outputs connected to the up and down count inputs of a counter 285. The AND gate 281 is enabled if the value from the subtraction is positive and AND gate 283 if the value is negative. Further, the gates will only be enabled as there is present an output on line 287 from comparator 275. This output will be present for as long as the count in counter 279 is not equal or greater than the output of subtractor of 273. In this manner the number stored in counter 285 will be increased or decreased depending on the amount and direction of the error obtained from subtractor 273. The output of counter 285 is added to a quantity $N/2 + 1$ stored in a register 289 in an adder 291 and the output provided as an input to register 239. Thus, the number in counter 285 will continually be adjusted until the output of subtractor 273 is zero. At this point the output of counter 285 when summed with the quantity $N/2 + 1$ and provided to register 239 will cause the required amount of phase shift to provide the needed indication of altitude.

When the system reaches the point where the error out of subtractor 273 is zero, the value stored in register 239 may be used to determine the phase difference. The phase difference may be obtained by multiplying this number by $360/n$ and subtracting 225 to give the phase difference between the reference and the received signal in degrees.

The countdown ratio sets a limit to the precision with which phase may be determined in a single measurement, i.e., for one pair of sample sets. If the ratio is N, the precision in degrees is $\pm 360/2N$; thus if N is 10, the precision of a single measurement is $\pm 18°$. Over a large plurality of measurements, where the individual true values are permitted to fall anywhere, the errors are assumed to be uniformly distributed in the range $+360/2N$ and $-360/2N$ and the standard deviation of the error would be $360/(2N \sqrt{3})$ or $360/3.46N$ in degrees. Again, if N is 10, the standard deviation of the error would be 10.16°. For those situations where the true value is fixed but other error sources cause fluctations of the indicated value which are comparable to or greater than the precision, averaging over many measurements will yield a mean value whose precision is greater than that of a single measurement.

It has been tacitly assumed in all of the foregoing that the phase of the FM reference square wave would be preserved in creating the actual transmitter sinusoidal modulating signal. Furthermore, it was also tacitly assumed that there would be no phase shift at the FM frequency in any receiver amplifier used between the output of the homodyne detector and the input to the leakage elimination filter. Although the aforementioned conditions are not difficult to achieve, there might be an advantage in not controlling these two parameters. For the latter case, it would be necessary to create a test signal for the purpose of establishing a reference phase. One way of doing this would be to pass the actual modulating signal through the homodyne detector amplifier during a calibrate mode; the signal level here would be made high enough so that noise is negligible. The phase of the amplifier output would then be the zero phase reference. One set of its zero crossings would be used to clear counter 223, thereby synchronizing its overflows. However, it would now be necessary to provide a fourth counter, modulo $N/2$, and a fourth flip-flop which it would set and reset. The square wave from this flip-flop would then be used to create a synchronous sinusoid for the purpose of the frequency modulating the transmitter.

Thus a digital frequency tracker which may also be used to determine aircraft altitude has been shown. Although specific embodiments have been shown and described it will be obvious to those skilled in the art that various modifications may be made without departing from the spirit of the invention which is intended to be limited solely by the appended claims.

APPENDIX

In the digital frequency tracker described above, analog to digital conversion is effected by a simple two-level hard clipper, (e.g., a Schmitt trigger), the resultant waveform is sampled and stored as a sequence of one-bit words which are either +1 or −1. The next step is the computation of the normalized autocorrelation function of the clipped waveform, $r(kT)$, where T is the sampling period and $kT$ is the delay. Using $s(n)$ as the $n$th clipped signal sample, the value of $r(kT)$ is given by:

$$r(kT) = \frac{1}{N} \sum_{n=1}^{N} s(n)s(n+k) \qquad (1-1)$$

The digital multiplications required to carry out the right side of Equation 1—1 are extremely simple since $s(n)$, $s(n + k)$ and their product involve word lengths of only one bit each. Furthermore, if N is arranged to be a power of two, the division called for is seen to be merely the shifting of the binary point.

The number of signal samples that must be stored depends on whether the calculation of the autocorrelation function is programmed as a serial operation ($k$ varies sequentially through its range), or as a paralles operation (all values of $k$ handled simultaneously). Assuming that the largest value of $k$ required is $K$, then for serial operation a total of $N + K$ signal samples must be stored, while for parallel operation, only $K$ signal samples would be stored. In both cases it would take $(N + K)$ sampling periods to accumulate all of the input required for the calculation of $r(KT)$. A trade-off study will be necessary to determine whether the greater storage requirements of the serial plan or the greater number of computing elements of the parallel plan is to be preferred.

The relationship between $r(\tau)$ and the normalized autocorrelation function of the signal before clipping, $\rho(\tau)$, is given by the following equation:

$$\rho(\tau) = \sin(\pi/2\, r[\tau]) \quad (1\text{-}2)$$

(as described in R.F. Baum, "The Correlation Function of Smoothly Limited Gaussian Noise," IRE Trans. Inf. th., Vol. IT3, pp. 193–197, Sept. 1957.)

Figure 8:
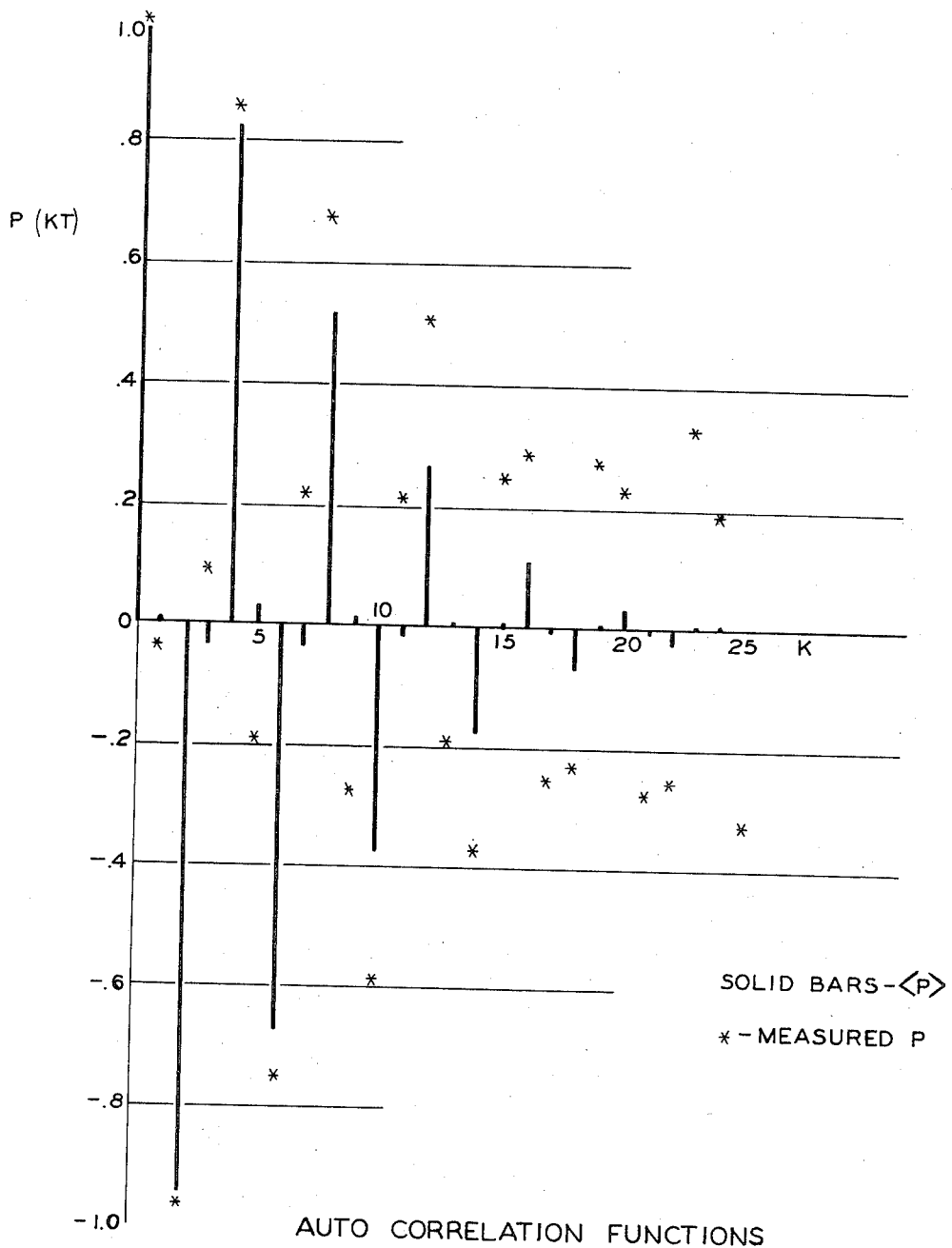
FIG. 8 is a plot of autocorrelation functions showing computed and measured values.

Strictly speaking, Equation 1-2 applies only to the limiting value of $r(\tau)$ as $N \rightarrow \infty$ (i.e., calculated from an infinite number of clipped signal samples). However, if $N$ is large compared to the number of samples in one correlation time (the value of $\tau$ beyond which both $\rho$ and $r$ remain essentially zero) then Equation 1-remains a useful relationship. FIG. 8 shows some typical results applying Equations 1-1 and 1-2 to a set of clipped signal samples where the spectrum of the signal before clipping was centered at one quarter the sampling frequency with a 20 per cent fractional bandwidth. Since the computation was performed on a sequence of samples, the results are available only at integral multiples of the sampling period. The limiting or expected values of $\rho(kT)$ are shown as solid bars; asterisks indicate the results from Equations 1-1 and 1-2 with $N = 150$.

Since $r$ is normalized autocorrelation function, it must be that $$r(0) = 1;$$

as a result of this and the form of Equation 1-2, it must also be true that $$\rho(0) = 1$$

Hence, no error can be incurred at $k = 0$. However, as $k$ increases, the errors appear to grow. For $k$ so large that the expected value of $\rho(kT)$ is essentially zero, the errors in the measured values of $\rho$ have a noiselike quality with a roughly constant standard deviation and a quasi-periodicity comparable to that of the signal. Examination of FIG. 8 will reveal the validity of the foregoing statements.

The observed behavior of the tails of the calculated autocorrelation function may be explained from the nature of the input signal and the way in which the computation is made. First it should be noted that a sampled waveform whose spectrum is centered at one quarter the sampling frequency with a 20 percent fractional bandwidth is essentially decorrelated after a sequence of 10 samples (in an interval 10 sampling periods long, a sinusoidal component at either band edge, i.e., 3 dB point, would gain or lose $\pi/2$ radians in phase relative to the component at the band center.) Hence loosely speaking, the signal sequence may be broken up into groups of 10 samples each, with the phase maintained within each group but shifting randomly in any amount from $+\pi$ to $-\pi$ radians in going from one group to another. The product sequence (terms like that to the right of the summation sign in Equation 1-1) also may be broken up into groups of 10, each such group having been created by the term-by-term multiplication of two signal groups, the possible phase difference between the two groups is anywhere from 0 to $\pi$ radians.

If the phase inside each signal group were really constant, the sum over a group of 10 product terms could lie anywhere between +10 and −10, the probability density of the sum, $y$, being equal to 1/20 for $[y] < 10$ and being equal to 0 for $[y] > 10$. (This is the probability density of the integral over ten periods of the product of the two zero meat amplitude square waves of the same frequency but random phase displacement.) The variance of the sum is given by:

$$2\int_0^{10} y^2 p(y)\,dy = \frac{2}{20}\int_0^{10} y^2 dy = \frac{2}{20}\left(\frac{10^3}{3}\right) = 33.3$$

Hence, the standard deviation of the average over 150 terms (a sequence of 150 terms of 15 statistically independent groups of 10) i.e., the rms value of $r$ for large $k$ becomes:

$$\sqrt{(33.3)(15)}/150$$

To calculate the rms value of $\rho$ from that of $r$, Equation 1-2 is used; in this case, since the standard deviation of $r$ is much less than 1, the sine function in Equation 1-2 may be replaced by its argument. Therefore, an estimate of the standard deviation in the calculated value of $\rho$ for large $k$ is given by:

$$(\sqrt{500}/150)(\pi/2) = 0.234$$

which is comparable to the results shown in FIG. 8.

The quasi-periodicity of the calculated value of $\rho$ for large $k$, which may be observed in FIG. 8 is another consequence of the semicoherent nature of the signal over one correlation time (i.e., over an interval of 10 sampling periods). Within such an interval and before clipping, the signal will approximate a constant amplitude sinusoid with a frequency somewhere within the band defined by the signal power spectral density. After clipping, the signal becomes a square wave at the same frequency. Suppose now that two such signal sections (or actually, samples thereof) are initially in phase; the sum of the products will have a maximum positive value. As the delay, $kT$, is increased, the displaced signal section will slide out of phase and in phase alternately with the fixed section and the sum of the products will oscillate between approximately maximum positive and maximum negative values. Since the frequency of each section is nearly the same as that of the other (assuming a narrow band spectrum), the rate of oscillation of the sum is the same as that of the signal. Of course, there are really 15 groups of 10 samples to be considered, but this means only that the reasoning just given applies to the magnitude of a vector sum rather than to only one component. In addition, just as the signal phase varies from one group of 10 samples to the next, so also does the phase of the quasi-periodicity of $\rho$ when $k$ is large; this accounts for the noiselike character that is also evident in FIG. A-1 when $k$ is large.

The calculation of the signal power spectral density is accomplished by treating the values of $\zeta(kT)$ as the coefficients of a Fourier cosine series, using the sampling rate as the fundamental frequency. This conclusion is arrived at by viewing the sampling technique as a modulation process. Starting with a signal that has no significant component above half the sampling frequency, the spectrum associated with the resultant sample sequence duplicates the band around zero frequency at each harmonic of the sampling frequency, both positive and negative (J. G. Truxal, "Control System Synthesis," McGraw-Hill, 1955 Chapter 9, pp. 501–506). Thus, the spectrum of the samples is both an even function and a periodic function in the frequency domain, with a fundamental period equal to the sampling frequency.

As with any periodic function, the spectrum of the samples may be represented by a Fourier series, and since the spectrum is an even function, the series will contain only cosine terms. Using $1/T$ as the sampling frequency and $f$ as the variable, the Fourier coefficients are given by the following equations:

$$A(0) = T \int_0^{\frac{1}{2T}} P(f) df \qquad (1-3)$$

$$A(k) = 2T \int_0^{\frac{1}{2T}} P(f) \cos 2\pi k f T df \qquad (1-4)$$

In the last two equations, $P(f)$ is the power spectral density of the original signal. The correctness of this formulation may be seen from the fact that $A(0)$ is the mean variance density of the sampled signal and $A(0)/T$ is its total variance. Since $P(f)$ is 0 for $f = 1/2T$, the integral in the right side of Equation 1-3 turns out to be the total power in the original signal, as it should be. (S.O. Rice, "Mathematical Analysis of Random Noise," Part 11, B.S. T.J., Vol. 23, p. 31.)

The standard relationship between the autocorrelation function of the original signal, $R$, and its power spectral density also show that:

$$R(0) = A(0)/T \qquad (1-5)$$

and $$R(kT) = A(k)/2T \qquad (1-6)$$

Hence, the Fourier series for the power spectral density may be written as shown below:

$$P(f) = TR(0) \left\{ 1 + 2 \sum_{k=1}^{\infty} \rho(kT) \cos 2\pi k f T \right\} \qquad (1-7)$$

where $$\rho(kT) = R(kT)/R(0) \qquad (1-8)$$

It is proposed to use the quantity within the curly bracket on the right side of Equation 1-7 as an estimate of the signal power density at frequency $f$. This estimate is independent of the total signal power level, $R(0)$.

Figure 9:
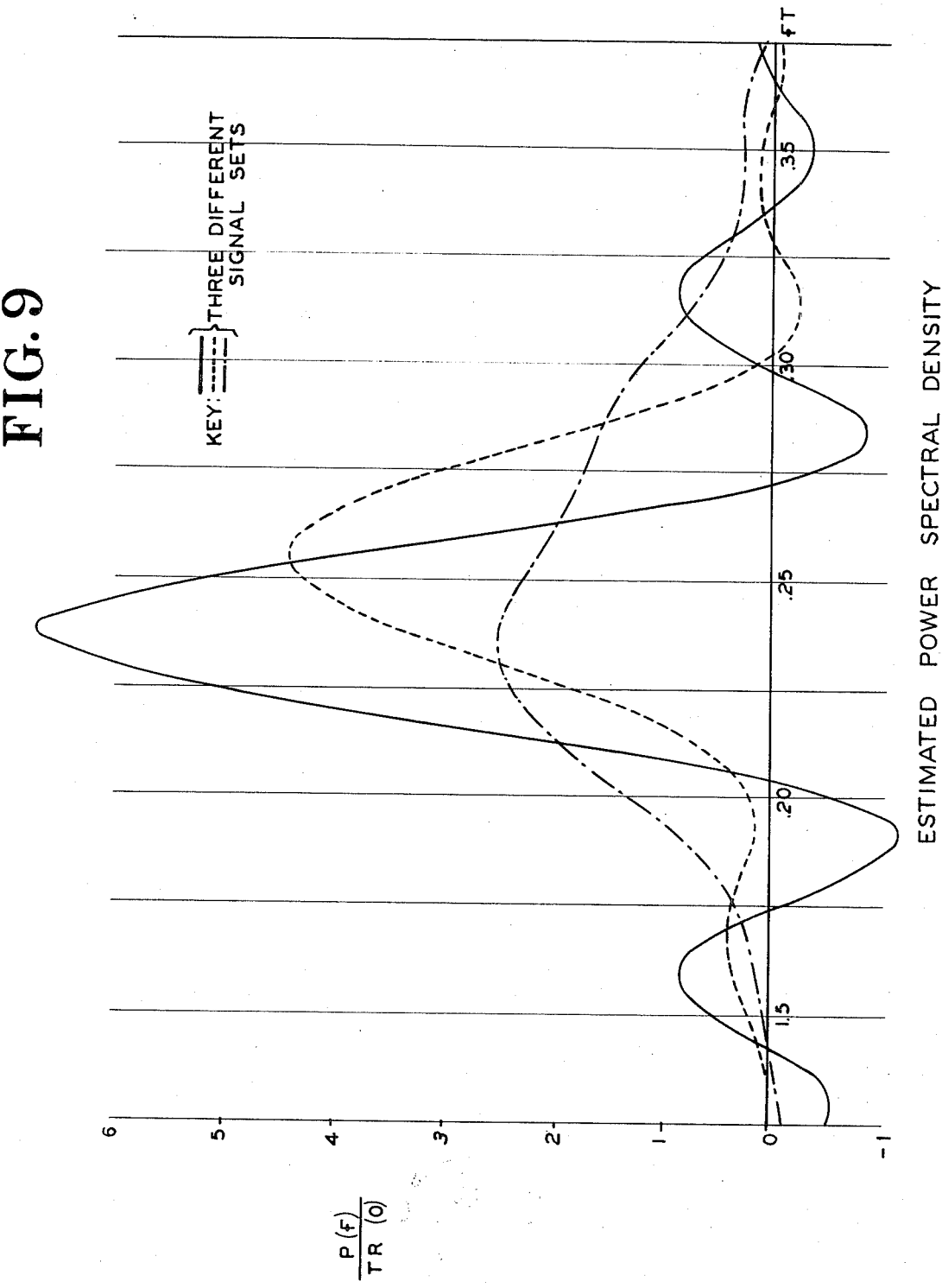
FIG. 9 is the plot of estimated power spectral density for three different signal sets.
Figure 10:
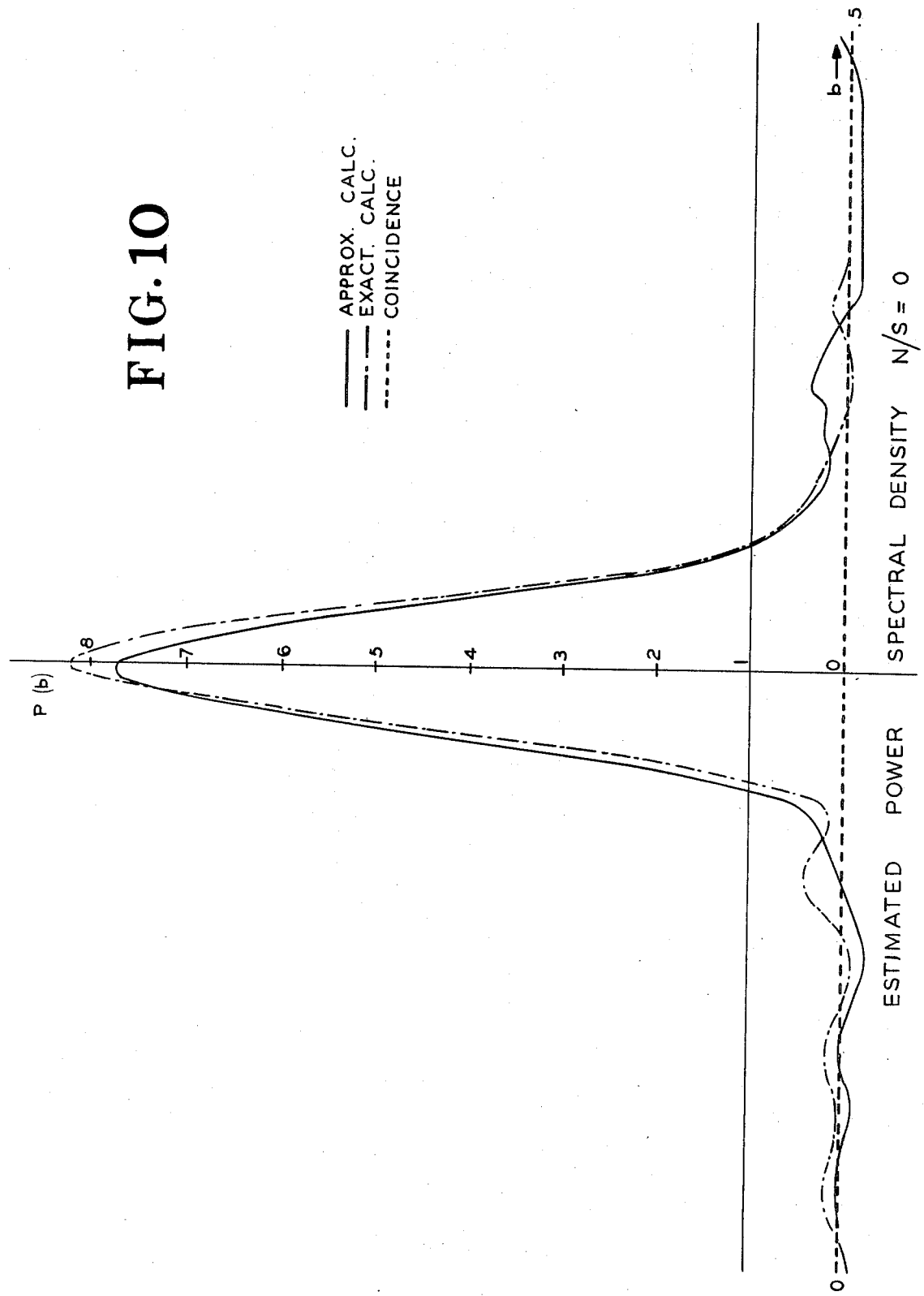
FIG. 10 is a similar plot where a large number of signal samples has been used to calculate the autocorrelation functions.

There is one serious deficiency in Equation 1-7 that must be remedied before it can be used for computation (viz., the value of the upper limit of the index of the sum). As a practical matter it cannot be infinite; more important, though, it should not be any larger than necessary. The penalties for using too small an upper limit on k will be loss of frequency resolution; a narrow spectrum will appear broader than it actually is, thus imparing the discernment of the exact position of the center frequency. On the other hand, a review of FIG. 8 shows that too large an upper limit on $k$ will admit the noisy type errors present in the tail of the estimated autocorrelation function. The fact that these errors have a quasi-periodicity comparable to that of the signal will cause their erroneous contributions to peak up strongly in the vicinity of the true spectrum center. Experiments performed in a study of this approach showed that an upper limit of $k = 15$ was about optimum for this situation. Three reconstructions of the estimated power spectral density from three different signal sets using Equation 1-7 with $k_{max} = 15$ are shown in FIG. 9. The estimates signal spectrum is well defined, although variable both in amplitude and position from one signal set to the next occasionally corrupted by extraneous sidelobes. Reduction of the fluctation in the spectrum estimate is achieved by increasing $N$ (i.e., by using a larger number of signal samples to calculate the autocorrelation function). A typical example of a power spectral density estimate with $N = 530$, which is about a three-fold increase, is shown in FIG. 10. The power spectral density curve determined from the unclipped signal (labelled exact calc.), is shown in the same figure for comparison.

Forming a running estimate of the spectrum center frequency...otherwise known as tracking...requires estimating the power spectral density at two different frequencies. The difference then is used to increase or decrease the average of the two prObe frequencies until they embrace the spectrum center symmetrically. These functions are performed by the hardware described in the above specification. A stored number is added to the difference between the two spectrum estimates the result retained as the current estimate of the spectrum center frequency, $F_0$. A fraction of $F_0$, added to and subtracted from $F_0$ to form $F_1$ and $F_2$, the two probe frequencies. The computing cycle is repeated with each new batch of signal samples of the required number.

The optimum fractional separation of the probe frequencies for sample batches were $N = 530$ was found empirically to be 17 per cent of the spectrum center frequency. Not surprisingly, this is also the separation between the points of maximum slope on the expected spectrum.

In the foregoing discussion of the digital tracking loop it was implicitly assumed that the initial estimate of the spectrum center frequency was fiarly close to the true value, sufficiently close so that the tracking loop could not lock on to an erroneous prominence. However, in practice it is necessary to find a valid initial estimate by means of a search procedure using a comparison standard to eliminate the possibility of a false lock-on. Since the potential for false lock-on is considerably greater at low signal-to-noise ratios...the previous discussion presumed no noise... it will be helpful to digress to discuss what happens when the input contains the Doppler signal immersed in a background of broadband noise.

The basis for the calculation of power spectral density proposed is the quantity $P(f)/TR(0)$, where $P(f)$ is the actual power density at frequency, $f$, $T$ is the sampling period and $R(0)$ is the total input power before clipping. Suppose that the value of $R(0)$ remains fixed and, as the background noise level is increased, the signal level is decreased correspondingly. The effect of this action would be to decrease the expected value of the peak signal power density while at the same time superimposing the entire expected signal spectrum onto a flat noise pedestal. In addition to the foregoing effects, at low signal-to-noise ratios, the fluctation from one spectrum estimate to the next is greater than with no noise, and spurious side lobes become more prominent with respect to the desired spectral lobe.

Figure 11:
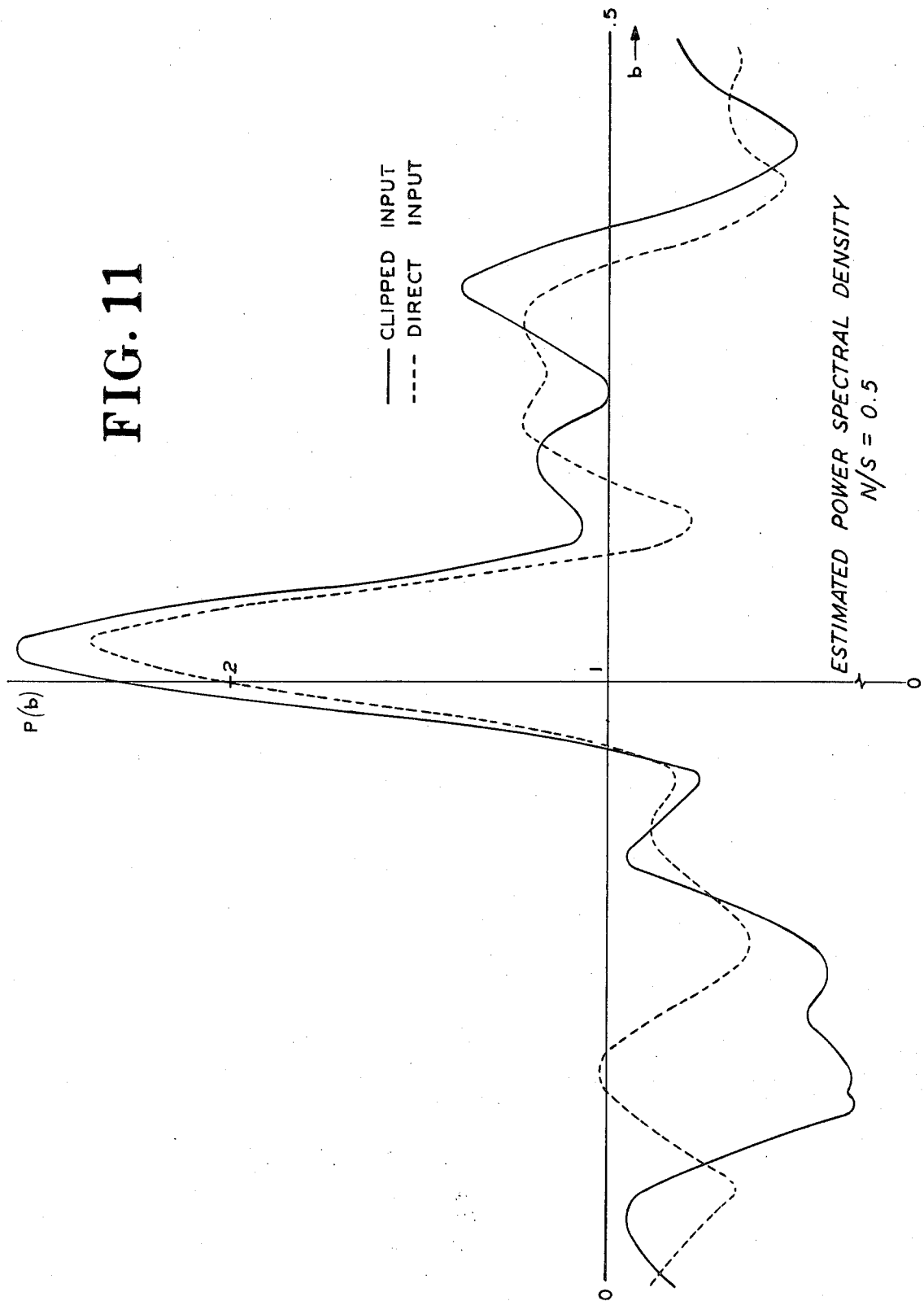
FIG. 11 is a similar diagram illustrating the difference between a direct input and a clipped input.

At low signal to noise ratios, the estimate of the noise density fluctuates widely from one region of the frequency domain to another. FIG. 11 illustrates this situation graphically. It is clear that any attempt to calculate the existing S/N ratio from the estimated power spectral density is bound to be inaccurate when S/N is low. Since this is precisely when a good knowledge of S/N is most needed for acquisition purposes, it was decided to use an integral measure of this quantity.

In view of the requirement that the integral of $P(b)$ over the interval $-1/2$ to $+1/2$ must be unity, the area under the signal lobe alone provides a measure of the S/N ratio. For the case at hand, the fractional bandwidth of the signal is 20 percent at the half power points. Hence, the integral over a 40 percent bandwidth around the spectrum center will yield very nearly all of the signal power plus an amount of noise power equal to the product of the bandwidth and the noise density. Suppose, for the moment, that $\beta$ is the signal spectrum center frequency and that E is the integral referred to above. Then $$E = 2 \int_{0.8\beta}^{1.2\beta} P(b)\,db,$$

where $P(b)$ is the normalized power spectral density estimate as given in (12). The factor 2 preceding the integral in (15) accounts for the image band at negative values of $b$.

The normalized total noise power outside of the signal bands being $1 - E$, the estimated noise density, $N$, is given by $$N = 1 - E/1 - 2(1.2\beta - 0.8\beta)$$
$$= 1 - E/1 - 0.8\beta$$

The total signal power denoted by ST, is then the difference between E and the product of N and the total signal bandwidth. This may be written as follows:

$$ST = E - N(0.8\beta),$$
$$= E - (1 - E)(0.8\beta)/1 - 0.8\beta$$
$$= E - 0.8\beta E - 0.8\beta + 0.8\beta E/1 - 0.8\beta$$
$$= E - 0.8\beta/1 - 0.8\beta$$

The expected value of ST is a function of the signal to noise ratio and of $\beta$, the signal center frequency. When $\beta = 0.25$ and $N/S = 0$, the expected value of the peak signal density (as stated previously) is 8.4. Let $$R = N/S$$

be the noise to peak signal density ratio. Then $$<ST> = 1/1 + 8.4\ 0.25/\beta R$$

The factor $(0.25/\beta)$ in (19) accounts for the inverse proportionality between the peak signal density in the absence of noise and the signal center frequency. To understand that form of the denominator of (19), consider that if the value of $N/S$ goes from 0 to $R$ and the total signal power remains fixed, then both the noise density and the total noise power would go from 0 to $8.4(0.25/\beta)R$. Hence the total power would rise from 1 to $[1 + 8.4(0.25/\beta)R]$. However, the form of our calculations requires the total power to remain at 1 for all values of $R$, so the last factor must be used to renormalize.

Returning to the estimated value of ST in (17), the numerator may be evaluated by substituting from (15) and (12) to get $$E - 0.8\beta = 2 \int_{0.8\beta}^{1.2\beta} P(b)\,db - 0.8\beta.$$

In view of the limits on the integral used to get (20), subtraction of the quantity of $0.8\beta$ in effect removes the constant term of $P(b)$. Referring to the power spectral density estimates in FIGS. 10 and 11, this is the same as subtracting 1 from every ordinate, i.e., making the horizontal dotted line the place where $P(b) = 0$.

Figure 12:
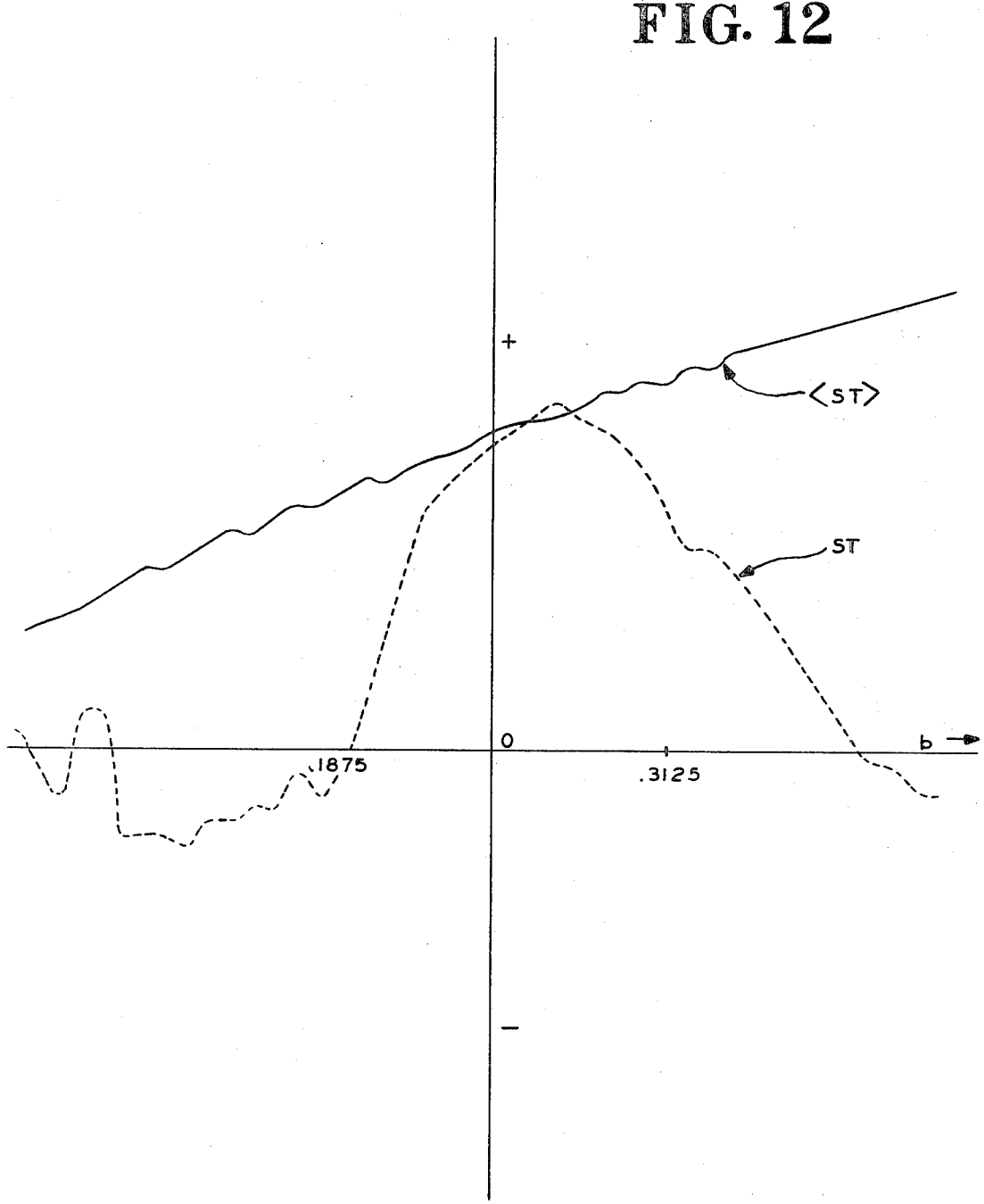
FIG. 12 is a plot of integrated power density.

If $\beta$ is now considered to be a variable, ranging from 0+ to somewhat below 0.5, then, at high S/N ratio (as in FIG. 10) the value of $E - 0.8\beta$, and therefore of ST, wil be negative everywhere except in the vicinity of the signal lobe, where it becomes strongly positive. At low S/N ratios (as in FIG. 11) the values of $E - 0.8\beta$ and ST will show essentially the same behavior except that both negative and positive excursions are diminished and oscillatory ripples are more evident. The integration involved in calculating ST has a smoothing effect on the fluctuations present in FIG. 11 and, therefore, is a better measure of the presence of signal during acquisition and of the signal magnitude during tracking than $P(b)$. This is illustrated in FIG. 12, which shows ST vs b for the same data set which gave rise to the estimated spectrum in FIG. 4. When $ST \geq <ST>$ a useable signal is available for tracking purposes.

The digital acquisition and frequency tracking scheme described previously was tested on a large-scale time-shared computer. The spectrum center frequency was placed at various points in the range from one quarter to one eighth the sampling frequency. Reliable acquisition and tracking were achieved down to signal-to-noise density ratios of 2:1. Instantaneous tracking accuracy for the 20 per cent spectrum width used was about 1.5 per cent at the lowest signal-to-noise ratio. The effective tracker time constant for these tests was about 1,330 sampling periods. Assuming a sampling frequency of 100 kHz, this translates to a time constant of 13.3 ms.

If it is further assumed that the highest spectrum center frequency is one quarter the sampling frequency, i.e., 25 kHz, and that the Doppler calibration constant is 16Hz/knot (transmitter at 13.3 GHz, $\gamma = 69.5°$) then this corresponds to a velocity of 1562 knots. The time required to fly 10 nautical miles at this speed is 23 seconds, or 1,733 tracker time constants. Hence the fluctuation error averaged over a 10-nmi distance travelled, extrapolates to $0.015/\sqrt{1,733}$ or 0.036 per cent, making the measurement one of very high precision.

Although the processing procedures described above pertain to a single lobed spectrum, simple and straightforward modifications will permit tracking multi-lobed spectra. In the case of the so-called "monopulse" spectrum, which consists of two adjacent lobes separated by a narrow null, the null position determining the center frequency, the two probe frequencies ($F_1$ and $F_2$) would be positioned on the sides of the valley and the error sense would be reversed to maintain negative feedback.

For the sequential, lobe-switched spectrum, where the crossover point of the two lobes determines the center frequency, a single probe frequeny at $F_0$ would be used.

I claim:

1. A digital frequency tracker for use in a doppler navigation system comprising:
   a. means to clip the input to the tracker to provide an output which is a series of pulses;
   b. a clock providing an output pulse train;
   c. means to sample and store the output of said clipping means at the occurrence of each clock pulse;
   d. means to compute from the sampled data a plurality of autocorrelation function values;
   e. means to store a value respresenting a frequency $F_0$;
   f. means to store a constant value;
   g. means to multiply said value representing $F_0$ by said constant;
   h. means to add the output of said multiplier to $F_0$ and store the result as $F_1$;
   i. first means to subtract the output of said multiplier from $F_0$ and to store the result as $F_2$;
   j. first means to compute and store the power at $F_1$ comprising means to compute a Fourier series wherein the stored value of $F_1$ is the frequency input and said autocorrelation function values the coefficients;
   k. second means to similarly compute and store the power at $F_2$;
   l. second means to subtract the computed values of power at $F_1$ and $F_2$ and to provide an output indicative of the magnitude and direction of the difference therebetween;
   m. first means responsive to said output to change the stored value representing $F_0$, so as to tend to make to power at $F_1$ and $F_2$ equal; and
   n. timing means responsive to inputs from said clock providing control inputs to each of said means to sample, means to compute, means to store, means to add, means to subtract and means to change the stored value representing $F_0$.

2. The tracker according to claim 1 and further including means to acquire a frequency $F_0$ which lies in the frequency range of the doppler signal and to provide a value representative thereof to said means to store said value representing $F_0$.

3. The tracker according to claim 2 wherein said means comprise:
   a. means to generate first and second timing signals;
   b. means to cause said first and second computing means to compute power in response to said first timing signal and to compute power dentiy from zero to $F_1$ and $F_2$ in response to said second timing signal;
   c. means to store a value representing an average noise power density;
   d. a comparator having said noise as a first input and providing a first output if a second input is greater than said first input and a second output if said second input is equal to or less than said first input;
   e. means to couple the output of said subtracting means to said first responsive means in response to said first timing signal and as second input to said comparator in response to said second timing signal;
   f. second means responsive to the second output of said comparator to change the value of $F_0$; and
   g. third means responsive to said second output to maintain the presence of said second timing signal as long as said second output is present.

4. The tracker according to claim 3 and further including means to provide an output indicative of altitude.

5. The tracker according to claim 4 wherein said doppler navigation system includes at least a doppler transmitter and a receiver and said altitude output means comprise:
   a. means to generate an FM reference for use in the doppler transmitter;
   b. means to generate a first sample pulse train at the frequency of said FM reference;
   c. means to generate a second sample pulse train having pulses shifted 90° from those on said first pulse train;
   d. means to alternately provide said first and second pulse trains as the clock input to the frequency tracker, each for a period of one power density computation;
   e. first storage means coupled to said second subtracting means to store a first power density obtained with said first pulse train as a clock input;
   f. second storage means coupled to said second subtracting means to store a second power density obtained with said second pulse train as a clock input;
   g. means to difference said first and second power densities;
   h. means to shift the phase of said first and second pulse trains with respect to said FM reference in response to the output of said differencing means such as to tend to make said first and second power densities equal; and
   i. means to store and provide as an output the difference in phase between said FM reference and said first pulse train, which difference will be proportional to altitude.

6. The tracker according to claim 5 wherein said means to generate an FM frequency comprise:
   a. a modulo N/2 counter;
   b. a high frequency clock providing an input to said counter; and
   c. a flip-flop obtaining its input from said counter and providing its output as said FM frequency; said means to generate a first sample comprises:
   d. a register;
   e. a second counter;
   f. a comparator having as inputs the outputs of said register and said second counter and providing an output when the two inputs are equal said output being a reset input for said second counter;
   g. a flip-flop obtaining its set input from the output of said modulo N/2 counter and its reset output from said comparator;
   h. an AND gate having as inputs said clock and the output of said flip-flop and providing its output as a count input to said second counter; and
   i. a one shot multivibrator having as an input the output of said comparator and providing said first pulse train at its output; said means to generate said second pulse train comprises:
   j. a modulo N/4 counter;
   k. a second flip-flop obtaining its set input from said comparator and its reset input from the output of said modulo N/4 counter;

21 l. a second AND gate having as inputs said clock and the output of said flip-flop and providing its output as a count input to said modulo N/4 counter; and m. a second one-shot multivibrator having the output of said module N/4 counter as an input and providing said second pulse train as its output;

said means to alternately provide said first and second pulse trains comprise:

n. a third AND gate having said first pulse train as an input;

o. a fourth AND gate having said second pulse trains as an input and having its output tied to that of said third AND gate and providing the sampling clock input to said tracker; and p. means to alternately enable said third and fourth AND gates; and said means to shift the phase of said pulse trains comprises:

q. means to add a function of the difference from said differencing means to N/2 + 1 and to provide said sum to said register whereby said register will have stored therein and may provide as an output the difference in phase between said FM reference and said first pulse train.

7. A method of frequency tracking with digital computing elements, in a doppler navigation system which includes at least a doppler transmitter and a doppler receiver which provides a tracker input signal comprising:

a. clipping the tracker input signal to provide a pulse train comprising a series of pulses;

b. sampling and storing said pulse train at fixed time intervals to determine the presence or absence of a pulse and storing an indication thereof to form stored data;

c. computing from the stored data a plurality of autocorrelation function values;

d. selecting a frequency $F_0$ having a frequency value in the range of the doppler frequency;

e. developing frequencies $F_1$ and $F_2$ which differ in frequency a predetermined amount above and below $F_0$;

22 f. computing the received power at the frequencies $F_1$ and $F_2$ using a Fourier series having said autocorrelation function values as coefficients;

g. subtracting said computed powers at the frequencies $F_1$ and $F_2$;

h. adjusting said frequency $F_0$ so as to tend to make the powers at $F_1$ and $F_2$ equal.

8. The method according to claim 7 wherein said frequency $F_0$ is selected by steps comprising:

a. scanning across the frequency spectrum in discrete $F_0$ steps;

b. computing at each $F_0$ step, with a Fourier series and said function values, the power density between two frequencies $F_A$ and $F_B$ on either side of $F_0$;

c. comparing said computed power density with a power density representative of the system noise between $F_A$ and $F_B$; and d. stopping at the $F_0$ step where the computed density exceeds said noise.

9. The invention according to claim 8 and further including steps to provide an output indicative of altitude comprising:

a. generating an FM frequency for use in the Doppler transmitter;

b. generating a first pulse train at said FM frequency;

c. generating a second pulse train with pulses 90° out of phase with those of said first pulse train;

d. computing a first power density from the tracker input signal using said first pulse train as a sampling input;

e. computing a second power density from the tracker input signal using said second pulse train as a sampling input;

f. subtracting said first and second power densities; and g. shifting the phase of said first and second pulse trains with respect to said FM reference to cause said two power densities to be equal whereby the amount of phase shift will be proportional to altitude.

* * * * *